(12) United States Patent
Kemmler et al.

(10) Patent No.: US 8,881,036 B2
(45) Date of Patent: Nov. 4, 2014

(54) DATABASE VIEW SYSTEMS

(75) Inventors: Andreas Kemmler, Bonnigheim (DE); Torsten Kamenz, Wiesloch (DE)

(73) Assignee: SAP AG, Walldorf (DE)

( * ) Notice: Subject to any disclaimer, the term of this patent is extended or adjusted under 35 U.S.C. 154(b) by 304 days.

(21) Appl. No.: 13/495,324

(22) Filed: Jun. 13, 2012

(65) Prior Publication Data

US 2013/0339881 A1    Dec. 19, 2013

(51) Int. Cl.
*G06F 3/00* (2006.01)

(52) U.S. Cl.
USPC .......................................... 715/762; 715/757

(58) Field of Classification Search
CPC ....................................................... H04L 67/02
USPC .................................................. 715/762, 757
See application file for complete search history.

(56) References Cited

U.S. PATENT DOCUMENTS

| | | | |
|---|---|---|---|
| 7,702,655 B1* | 4/2010 | Panelli et al. | 707/600 |
| 8,127,237 B2* | 2/2012 | Beringer | 715/762 |
| 8,150,886 B2* | 4/2012 | Rhodes et al. | 707/802 |
| 8,209,236 B2* | 6/2012 | Stone et al. | 705/26.41 |
| 2004/0117358 A1* | 6/2004 | von Kaenel et al. | 707/3 |
| 2007/0050340 A1* | 3/2007 | von Kaenel et al. | 707/3 |
| 2007/0203803 A1* | 8/2007 | Stone et al. | 705/26 |
| 2008/0215757 A1* | 9/2008 | Hellstrom | 709/246 |
| 2008/0313650 A1* | 12/2008 | Arnquist et al. | 719/316 |
| 2009/0063522 A1* | 3/2009 | Fay et al. | 707/100 |
| 2009/0083058 A1* | 3/2009 | Beringer et al. | 705/1 |
| 2009/0083643 A1* | 3/2009 | Beringer | 715/762 |
| 2009/0089254 A1* | 4/2009 | Von Kaenel et al. | 707/3 |
| 2009/0260022 A1* | 10/2009 | Louch et al. | 719/328 |
| 2010/0114941 A1* | 5/2010 | Von Kaenel et al. | 707/769 |
| 2011/0004830 A1* | 1/2011 | Von Kaenel et al. | 715/751 |
| 2011/0270833 A1* | 11/2011 | Von Kaenel et al. | 707/736 |

OTHER PUBLICATIONS

Getting started with In-Memory Business Data, retrieved from http://scn.sap.com/docs/DOC-24158, created on Mar. 6, 2012, last modified on May 23, 2012.

* cited by examiner

*Primary Examiner* — William Titcomb
(74) *Attorney, Agent, or Firm* — Fountainhead Law Group PC (57) ABSTRACT

Embodiments of methods and systems for database viewing, create a copy of a vendor view in a customer view layer that is present between an interface layer and the database layer. In certain embodiments this copy of the vendor view may contain no customer specific logic, simply serving as a 1:1 projection in the customer view allowing the vendor to track customer access to particular vendor views. According to some embodiments, the copy of the vendor view may be changed to create a modification view. Changes are applied to the modification view only, leaving the original vendor view unchanged with a link to the stored modification copy. This link can be used to adjust the modification copy whenever a hot fix or a new version of the 'modified' database content is installed to the customer system. Embodiments may support consumer extensions to the vendor views and/or to the database itself.

11 Claims, 8 Drawing Sheets

DATABASE VIEW SYSTEMS

BACKGROUND

Embodiments of the present invention relate to database systems, and in particular, to systems and methods providing views of database content.

Unless otherwise indicated herein, the approaches described in this section are not prior art to the claims in this application and are not admitted to be prior art by inclusion in this section.

Databases are valuable tools for the organization, storage, and visualization of information. A plurality of analytic tools (e.g. software applications) may be designed to allow a consumer to interact with, and retrieve information from, a database.

A database vendor typically provides a set of database views (vendor views) that are available. These vendor views of the database are directly consumed by the analytic tools.

Accordingly, it is difficult for a vendor to generically identify which particular database view is being used in an analytic tool. It may therefore be difficult to disseminate to customers, targeted information regarding newly available view functionality (e.g. new vendor views or updated view versions) useful to them.

Additionally, customers may extend and/or modify the vendor views. Such extensions or modifications need to be recognized and factored into the installation of new or upgraded versions of views offered by a vendor. In particular, the existing customer view extensions may need to be supported, with differences/changes over the vendor view versions accurately migrated to the new customer configuration. Alternatively, modifications to the new database system can be made to accommodate the customer views, but this can be a time-consuming process.

Accordingly, the present disclosure addresses these and other issues with systems and methods providing database views.

SUMMARY

Embodiments of methods and systems for database viewing, create a copy of a vendor view in a customer view present between a user interface (UI) layer and the database layer. In certain embodiments this copy of the vendor view may contain no customer specific logic, serving simply as a 1:1 projection in the customer view layer allowing the vendor to track customer access to particular vendor views. According to some embodiments, the copy of the vendor view may be changed to create a modification view. Changes are applied to the modification view only, leaving the original vendor view unchanged with a link to the stored modification copy. This link can be used to adjust the modification copy whenever a hot fix or a new version of the 'modified' database content is installed to the customer system. Embodiments may support consumer extensions to the vendor views and/or to the database itself.

An embodiment of a computer-implemented method comprises providing a database layer comprising a database table and a vendor view thereto, causing a view engine to create a copy of the vendor view in a customer view layer between the database layer and a user interface layer, and storing a link between the copy and the vendor view.

An embodiment of a non-transitory computer readable storage medium embodies a computer program for performing a method comprising providing a database layer comprising a database table and a vendor view thereto, causing a view engine to create a copy of the vendor view in a customer view layer between the database layer and a user interface layer, and storing a link between the copy and the vendor view.

An embodiment of a computer system comprises one or more processors and a software program, executable on said computer system. The software program is configured to access a database layer comprising a database table and a vendor view thereto, cause a view engine to create a copy of the vendor view in a customer view layer between the database layer and a user interface layer, and store a link between the copy and the vendor view.

Certain embodiments may further comprise causing the view engine to implement a change in the copy to create a modification view, causing the view engine to maintain the link between the modification view and the vendor view.

In some embodiments the view engine is caused to implement the change by a database vendor during an upgrade process.

According to particular embodiments, the vendor view may comprise a customer extension, and the copy may include the customer extension.

Some embodiments may further comprise storing tracking information regarding customer access to the link.

Particular embodiments may further comprise communicating the tracking information to other than a customer.

In certain embodiments, the information is communicated to a database content vendor.

The following detailed description and accompanying drawings provide a better understanding of the nature and advantages of particular embodiments.

DETAILED DESCRIPTION

Described herein are techniques for providing database views and modification thereof. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
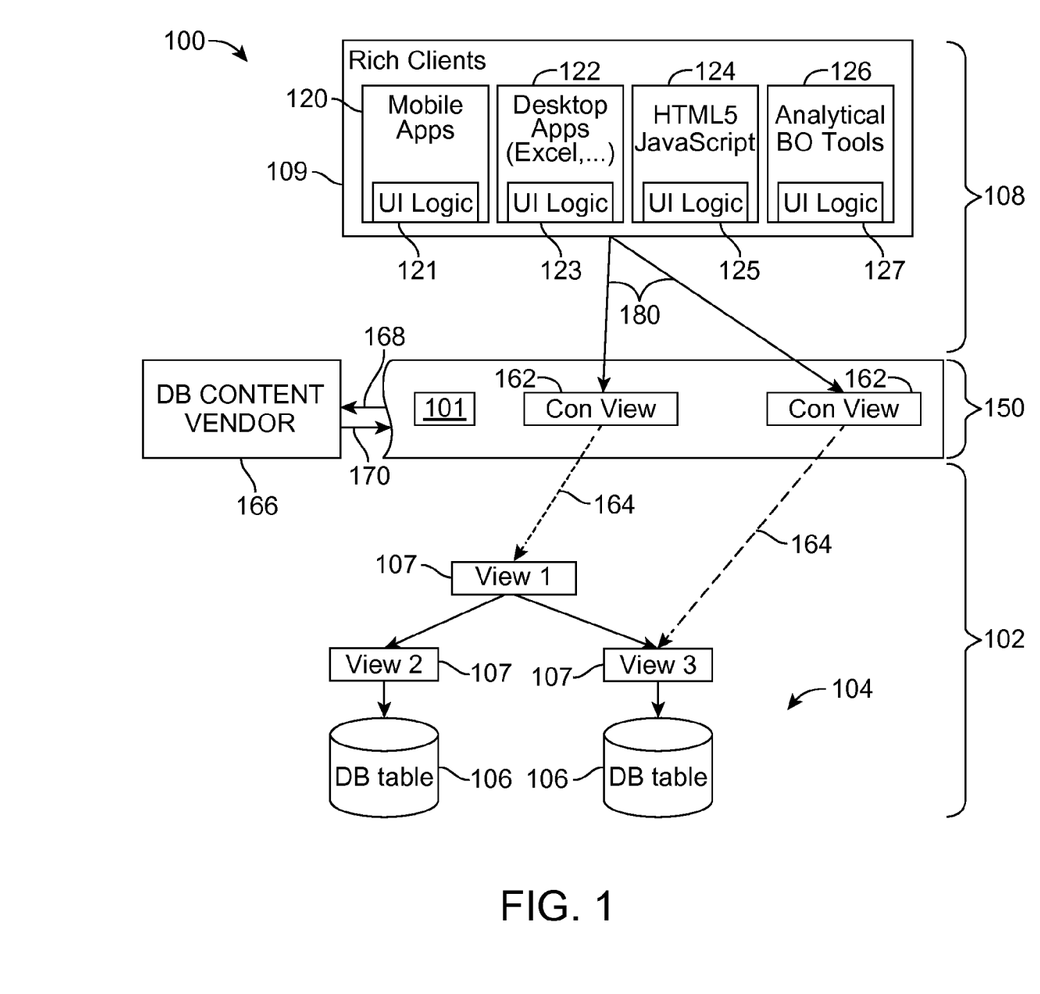
FIG. 1 is a simplified diagram showing a system configured to provide database views according to an embodiment.

FIG. 1 shows a simplified view of a conventional system configured to provide database views. Specifically, system 100 comprises a user interface layer 108 in communication with a database layer 102. In certain configurations, the user interface layer may reside on a client side remote from the database layer residing on a server side.

The database layer 102 includes a database 104 comprising a plurality of database tables 106. The database layer is configured by a database vendor, to present a number of vendor views 107 of information contained in the database.

The user interface layer 108 features rich client(s) 109 comprising a plurality of analytical tools that are used by customers to consume the vendor views. Examples of such analytical tools can include but are not limited to, mobile applications 120 and associated user interface (UI) logic 121, desktop applications 122 and associated UI logic 123, HTML5 or JavaScript 124 and associated UI logic 125, and analytical business object (BO) tools 126 and associated UI logic 127.

System 100 further includes customer view layer 150 present between the interface layer and the database layer. The customer view layer includes one or more database views generated by a view engine 101. In particular, the customer view layer comprises a plurality of consumer views 162. These consumer views can be connected by stored links 164 to a corresponding vendor view in the database layer, for example as a 1:1 projection thereof.

The stored link may be made accessible, especially for an installation process/engine. The stored link may be made accessible, for example, by offering a corresponding application program interface (API).

In order to consume the particular database view desired, the user interface layer issues a call 180. Rather than this call being communicated directly to the corresponding vendor view as in conventional approaches, according to particular embodiments this call is instead communicated to the corresponding consumer view of the customer view layer.

The system may retrieve information about the views used, or provide information about changed views directly to the customer. This can be done inside the database system at the customer side, once the customer imports a new version of the database layer content. The database layer or the view engine may provide information to the customer regarding changed/new views, and also about customer views affected by these changes using the relation between customer views and vendor views.

As shown in FIG. 1, in some embodiments a database content vendor 166 may access the customer view layer. According to certain embodiments, the view engine or another component of the customer view layer could track usage of particular database views by specific customers. For example, the view engine could store and periodically communicate database view tracking information 168 to the database content vendor. Alternatively, the view engine can provide the tracking information in response to an inquiry 170 from the database content vendor.

In such embodiments, the database content vendor is poised to provide specific, relevant information targeted to the customer concerning available functional updates of the vendor views. Such tracked view usage information communicated to the database content vendor, may also allow that vendor to tailor future offerings based upon popularity (or unpopularity) of particular views.

Figure 2:
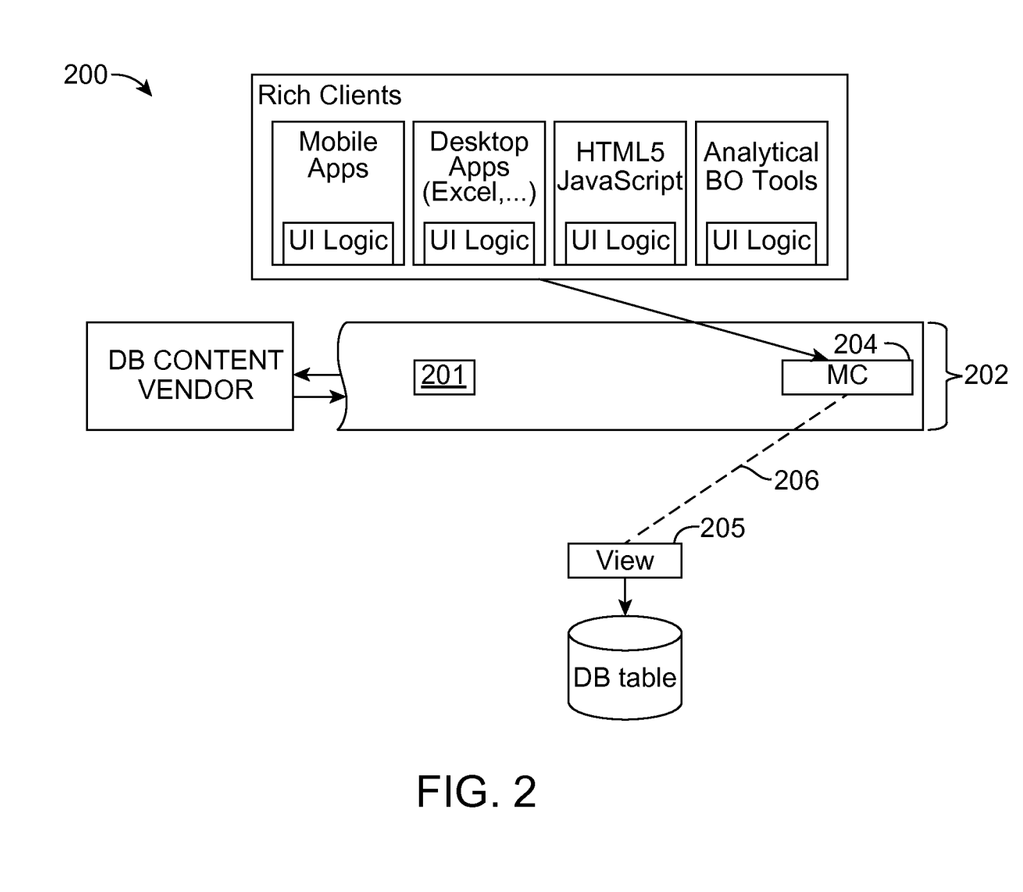
FIG. 2 is another simplified diagram showing a system configured to provide database views according to an embodiment.

FIG. 2 is another simplified diagram showing a system configured to provide database views according to an embodiment. In this system 200, the customer view layer 202 comprises a modification view 204 created by the view engine 201.

This modification view can originate as a copy of a vendor view 205 of the database layer. The modification view, however, may include changes to the original copied vendor view. Such changes represented by the modification view, may be applied only to this modification copy. A link 206 between the original vendor view and the modification copy is stored. This link can be used to adjust the modification copy, whenever a hot fix or a new version of the 'modified' view, is installed to the customer system (e.g. by a vendor).

While FIG. 2 shows the copying and modification of a database view within the interface layer, this is not required. Alternative approaches could employ copying and/or modification of elements other than vendor views within an interface layer. Examples of such elements include but are not limited to objects, including database objects.

Figure 3A:
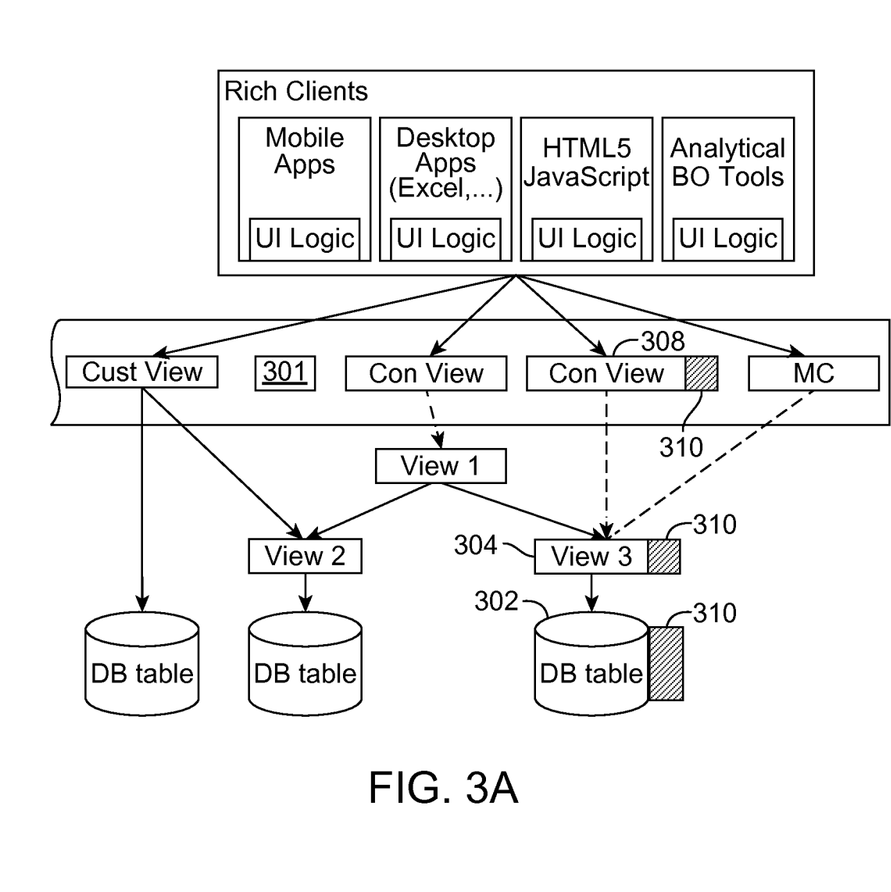
FIGS. 3A-C are simplified diagrams showing a system configured to provide database views according to an embodiment.
Figure 3B:
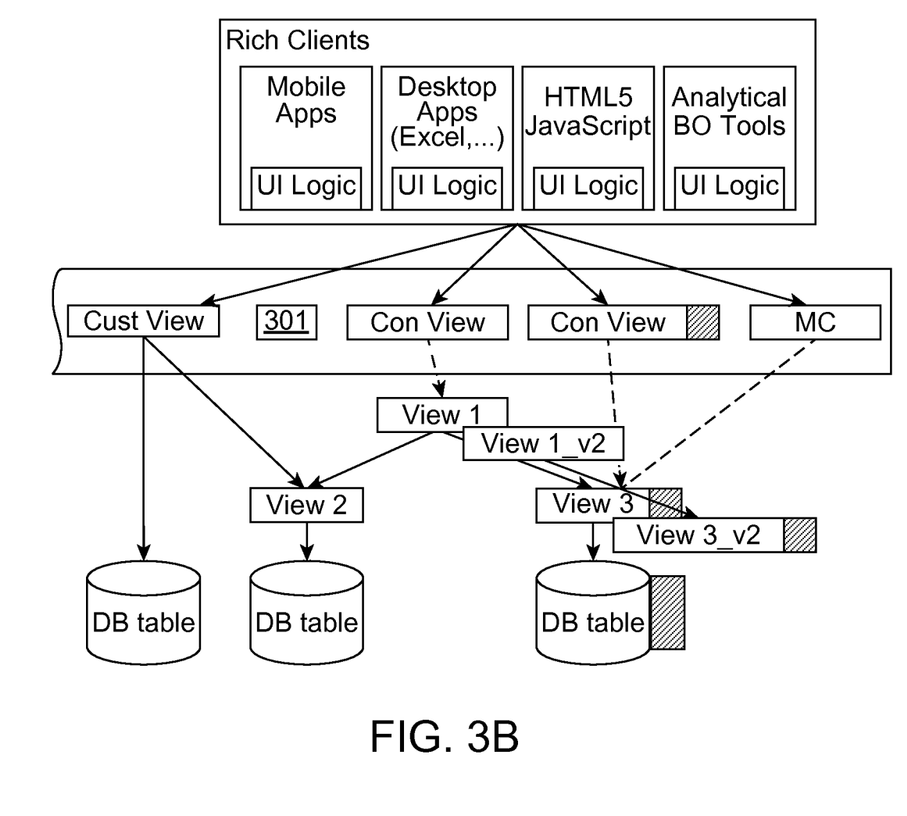
Figure 3C:
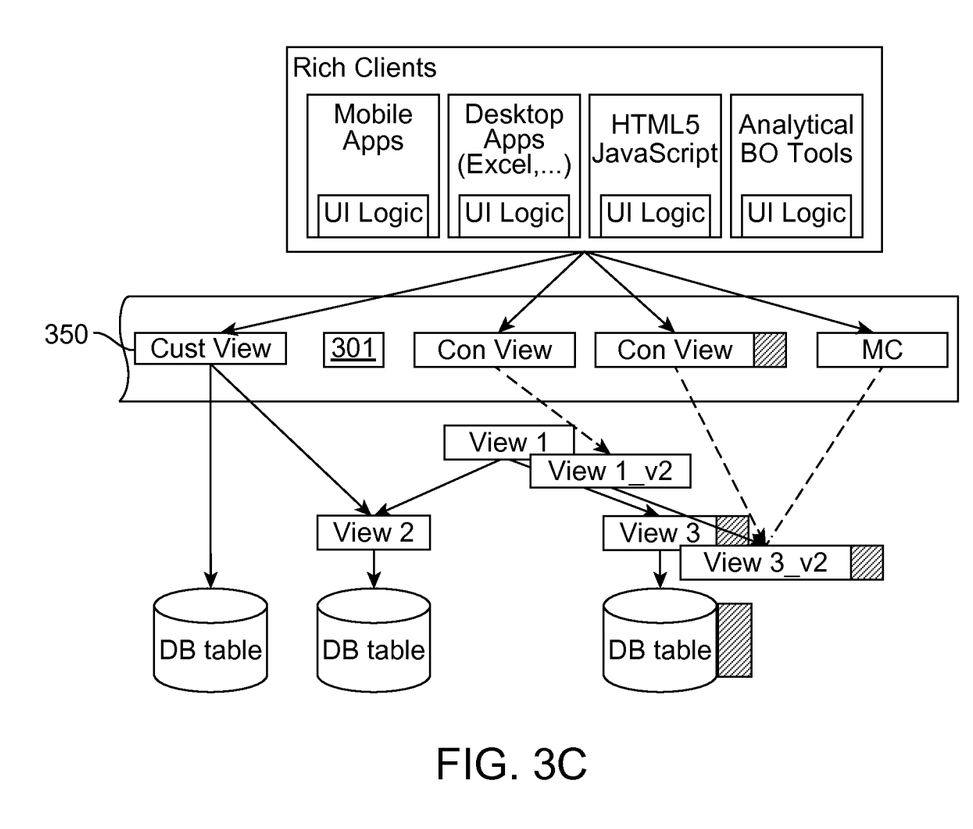
Figure 4:
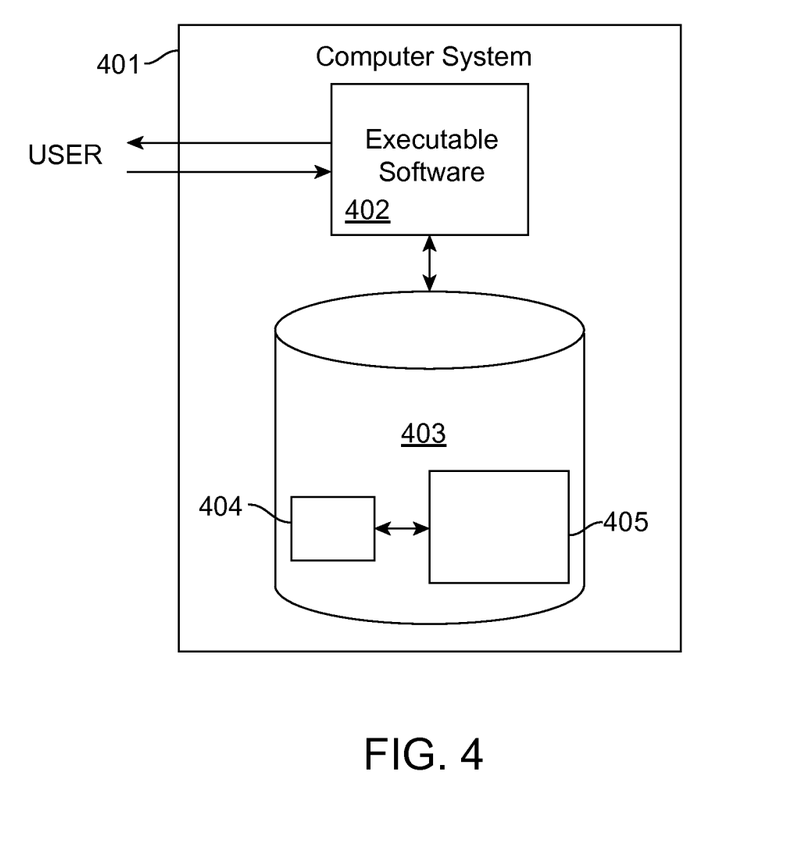
FIG. 4 illustrates hardware of a special purpose computing machine configured to perform database viewing according to an embodiment.

FIGS. 3A-C are simplified diagrams showing operation of a system 300 configured to provide database views according to an embodiment. In these figures the database vendor is not shown for purposes of clarity, and view engine is labeled as 301.

FIG. 3A shows the interface layer as including both consumer views as described in FIG. 1, and modification copies as described in FIG. 2. The interface layer of FIG. 3A also includes a customer view 350.

A customer view is a view that is under the control of a customer. A customer can decide how the customer view is designed and implemented, which fields it contains, and the database tables on which it is based. A customer view can be independent of any view provided by a vendor, or a customer view can be based on a vendor view. In the latter case, a customer view is 'calling' the corresponding vendor view, for example in the manner that the View 1 is calling the View 2.

By contrast, a consumer may be able to exert less control over a consumer view. For example a customer can decide whether or not a consumer view is created, but a customer cannot influence which fields the consumer view contains, or on which tables the consumer view is based. Thus while a customer view can be a full blown (freestyle) view tailor made by customers rather than by the vendor, a consumer view is a fixed projection on a vendor view.

FIG. 3A shows that both database table 302 and vendor view 304 of the database layer 306, can include respective customer extensions 310. These customer extensions can be taken over in the consumer view automatically, shown here in the corresponding consumer view 308.

As shown in FIG. 3B, these customer extensions can automatically be taken over to any new view versions installed to the customer system (e.g. by the vendor). FIG. 3C shows that customers can readily switch their customer views, consumer views, and modification views to any new view versions.

EXAMPLE

One embodiment is now described by way of a particular example. Specifically, SAP AG of Walldorf, Germany may offer a HANA database system with a first content package of HANA views installed by customers. With that first content package, the customers have access to a certain number of HANA views in their system.

In this simplified example, a particular customer may be making use of exactly two (2) of these views of the first content package. Thus according to embodiments, that customer triggers creation of corresponding consumer views for those SAP HANA views.

The customer may seek to extend one of the existing SAP HANA views by some customer specific fields. According to embodiments, these field extensions are then available at the SAP (vendor) view and at the corresponding consumer view.

At some point, SAP may offer another content package containing new versions of one or both of the two (2) views being used by the customer. The customer may decide to install the second content package.

According to embodiments, the installation process checks which views are used by the customer. This is done by identifying the consumer views that are being created.

Here, for both of the two (2) views currently used by the customer, a new view version is available. Embodiments allow the customer to identify differences between the view versions they are currently using, and the new versions.

When the customer chooses to switch to the new view versions, the corresponding consumer views are now automatically liked to the new view versions. The field extensions are also automatically copied to the new version.

Thus according to embodiments, the consumer views of the interface layer are allowed to remain the same. The analytic tools which are accessing those consumer views are not disrupted, and they can continue to access the same consumer views as were present prior to installation of the second content package.

Figure 6:
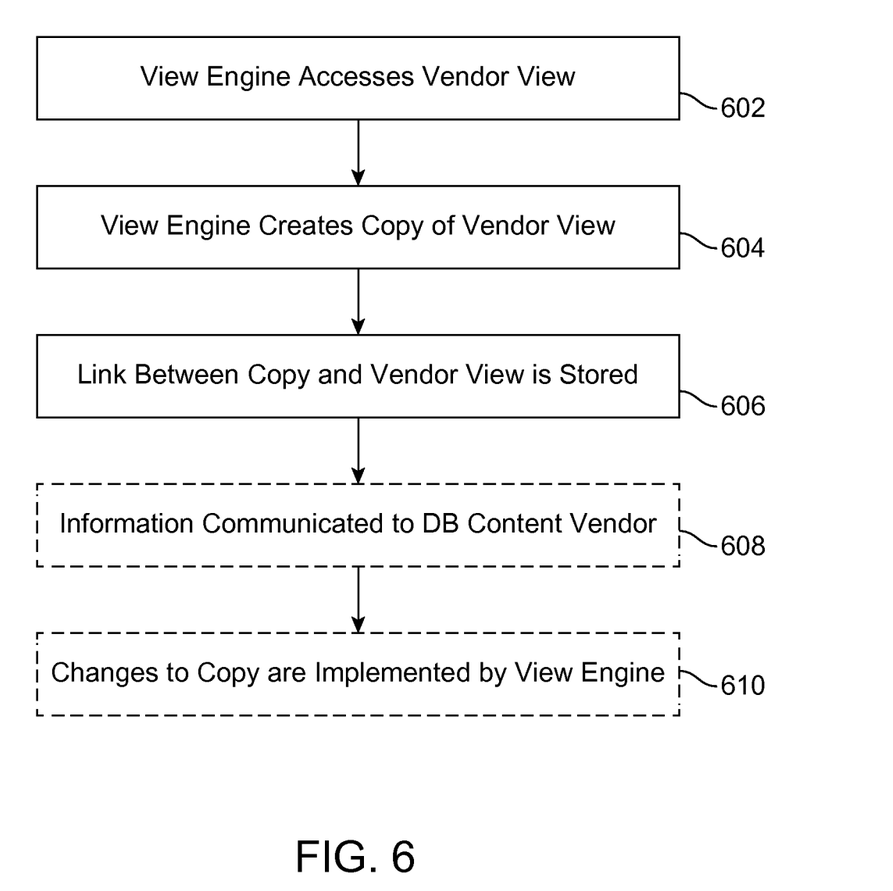
FIG. 6 is a simplified diagram showing a process flow according to an embodiment.

FIG. 6 is a simplified diagram showing a process flow 600 according to an embodiment. In a first step 602, a view engine is provided in communication a vendor view of a database layer.

In a second step 604, the view engine creates a copy thereof in a customer view layer. In a third step 606, the view engine stores a link between the copy in the customer view layer, and the original vendor view in the database layer.

This link may be stored in a manner facilitating its easy access at any time. During installation of new or updated views, the link may then be checked directly in the customer system to determine whether existing views are affected. Thus in certain basic embodiments, the mere existence of a consumer view indicates customer access to particular vendor views.

Moreover, according to certain extended embodiments, the customer view layer may actively communicate information with a database content vendor. Thus FIG. 6 shows an optional fourth step 608, wherein information is communicated from the customer view layer to the database content vendor. An example of such information can include but is not limited to real view usage data (e.g. the concrete calls of the consumer views) tracked by the view engine. This communicated information can then allow the database content vendor to inform customers about new versions of the views they are using.

In an optional fifth step 610, the view engine may implement changes in the copy to create a modification view. This has been described above in connection with FIG. 2.

Systems and methods for viewing databases according to various embodiments, may offer certain benefits. For example, some embodiments may allow a vendor to be aware of which particular views are being utilized by a customer. This can facilitate migration of that view (or a modified version thereof) to an updated version of the database.

Figure 5:
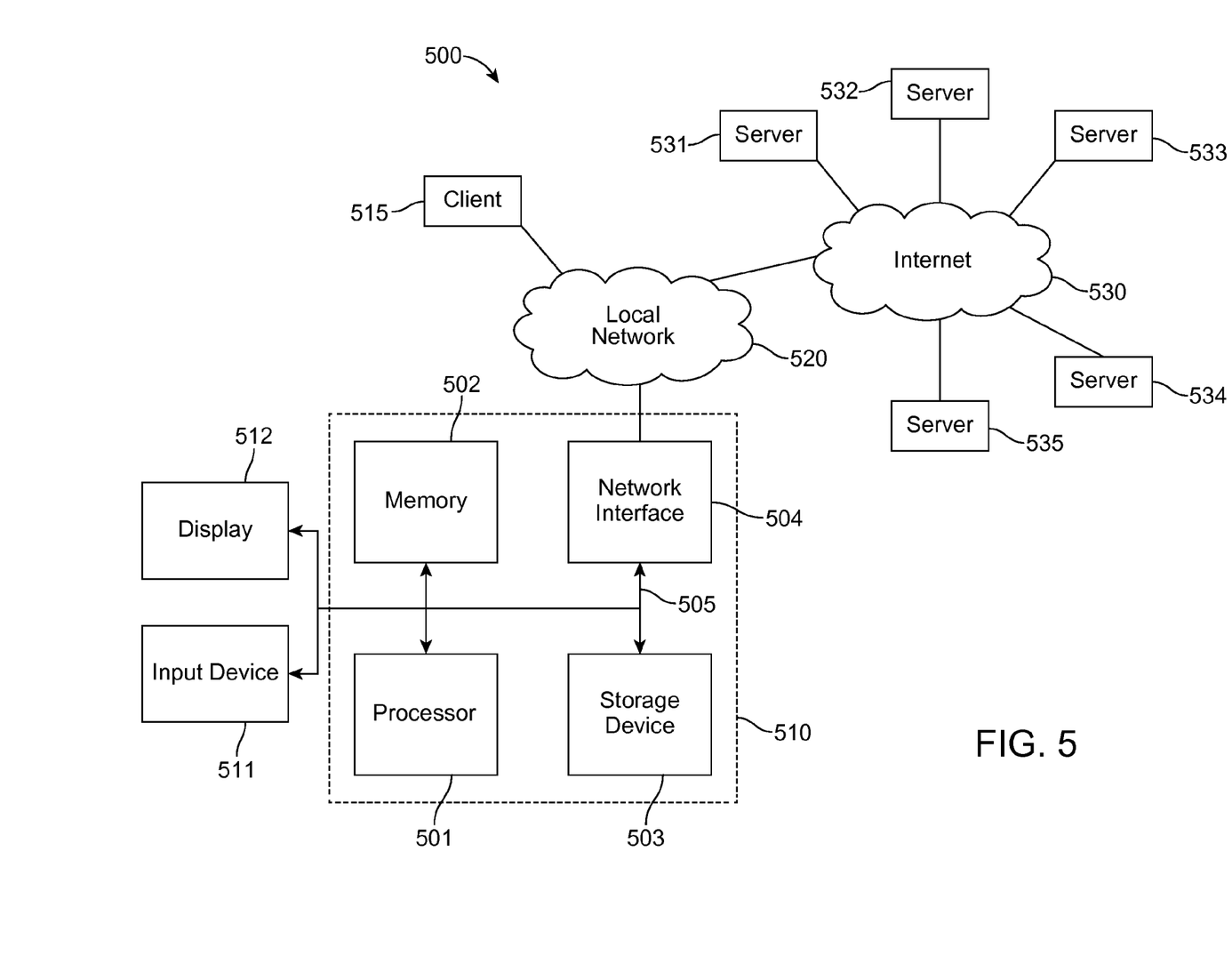
FIG. 5 illustrates an example of a computer system.

FIG. 5 illustrates hardware of a special purpose computing machine configured to provide database views according to an embodiment. In particular, computer system 500 comprises a processor 502 that is in electronic communication with a non-transitory computer-readable storage medium 503. This computer-readable storage medium has stored thereon code 505 corresponding to a view engine. Code 504 corresponds to customer views, consumer views, and/or modification views. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing a database layer comprising a database table and a vendor view thereto;
causing a view engine to create a customer view based upon the vendor view in a customer view layer between the database layer and a user interface layer;
storing a first link between the customer view and the vendor view;
communicating to a database content vendor, stored tracking information regarding the first link;
causing the view engine to implement a change in a copy of the vendor view to create a modification view; and
causing the view engine to create a second link between the modification view and the vendor view, wherein the vendor view comprises a customer extension, and the copy includes the customer extension.

2. A method as in claim 1 wherein the view engine is caused to implement the change by a database vendor during an upgrade process.

3. A method as in claim 1 wherein the stored tracking information comprises a popularity of customer access to the first link.

4. A method as in claim 1 wherein the customer view is based upon a database table not referenced by the vendor view.

5. A non-transitory computer readable storage medium embodying a computer program for performing a method, said method comprising:
providing a database layer comprising a database table and a vendor view thereto;
causing a view engine to create a customer view based upon the vendor view in a customer view layer between the database layer and a user interface layer;
storing a first link between the customer view and the vendor view;
communicating to a database content vendor, stored tracking information regarding the first link;
causing the view engine to implement a change in a copy of the vendor view to create a modification view; and
causing the view engine to create a second link between the modification view and the vendor view, wherein the vendor view comprises a customer extension, and the copy includes the customer extension.

6. A non-transitory computer readable storage medium as in claim 5 wherein the view engine is caused to implement the change by a database vendor during an upgrade process.

7. A non-transitory computer readable storage medium as in claim 5 wherein the stored tracking information comprises a popularity of customer access to the first link.

8. A non-transitory computer readable storage medium as in claim 5 wherein the customer view is based upon a database table not referenced by the vendor view.

9. A computer system comprising:
one or more hardware processors;
a software program, executable on a hardware processor of said computer system, the software program configured to:
access a database layer comprising a database table and a vendor view thereto;
cause a view engine to create a customer view based upon the vendor view in a customer view layer between the database layer and a user interface layer;
store a link between the customer view and the vendor view;
communicate to a database content vendor, stored tracking information regarding the first link;
cause the view engine to implement a change in a copy of the vendor view to create a modification view; and
cause the view engine to create a second link between the modification view and the vendor view, wherein the vendor view comprises a customer extension, and the copy includes the customer extension.

10. A computer system as in claim 9 wherein the stored tracking information comprises a popularity of customer access to the first link.

11. A computer system as in claim 9 wherein the customer view is based upon a database table not referenced by the vendor view.

* * * * *